March 27, 1962  S. J. HOFF  3,026,665
LAWN MOWER BLADE MOUNTING AND CONTROL
Filed Aug. 17, 1959  2 Sheets-Sheet 1

INVENTOR.
STEPHEN J. HOFF,
BY
*Schley, Nash & Jenkins*
ATTORNEYS.

March 27, 1962  S. J. HOFF  3,026,665
LAWN MOWER BLADE MOUNTING AND CONTROL
Filed Aug. 17, 1959  2 Sheets-Sheet 2

INVENTOR.
STEPHEN J. HOFF,
BY
Schley, Nash & Jenkins
ATTORNEYS.

3,026,665
LAWN MOWER BLADE MOUNTING
AND CONTROL
Stephen J. Hoff, Richmond, Ind., assignor to Hoffco, Inc., Richmond, Ind., a corporation of Indiana
Filed Aug. 17, 1959, Ser. No. 834,118
5 Claims. (Cl. 56—25.4)

This invention relates to a rotary lawn mower, and more particularly to the mounting and control of the cutting blade thereof.

In the usual rotary mower construction, an elongated cutter blade is mounted directly on a depending vertical shaft, commonly the crankshaft of a driving engine, and either rigidly or frictionally connected to the shaft. The use of a frictional connection is intended to minimize danger to the engine in the event the rotating blade strikes a solid obstruction, but this falls considerably short of its objective, and it is not uncommon for blade shafts to be bent as the result of the blade striking an obstruction. Moreover, in the event the blade becomes clogged with heavy grass, this stalls the engine, and the mower must be moved to a clear location and the blade freed from obstruction before the engine can be started. Further, a rigid or frictional drive connection between the engine and blade involves considerable danger from the fact that both the blade and engine always rotate together.

It is the object of my invention to provide a blade mounting in which the blade remains stationary during starting and idling of the engine, and is held stationary by a brake, with the drive shaft freely rotatable so that the engine can be started without rotating the blade. It is a further object of the invention to provide automatic clutch means in combination with the brake by which the brake is released and the blade drive established as soon as the engine throttle is opened. It is a further object of the invention to enclose the clutch and brake mechanism in a housing which also acts to prevent deflection and bending of the blade shaft.

In accordance with the invention, the mower blade is fixed on a hub or carrier which is rotatably mounted on the drive shaft and which carries the driven element of a centrifugal clutch. The carrier has close running clearance within an encircling housing which is fixed to the mower frame and which prevents any substantial deflection of the blade-supporting end of the shaft. The drive shaft carries the driving element or assembly of the centrifugal clutch, in operative relationship with the driven element on the blade carrier. A braking device, such as a brake band, is carried within the anti-deflection housing and is biased to normally engage a surface of the driven carrier assembly. The brake is released by a manual control, and such control is desirably connected to the throttle control of the engine, for common operation therewith, to release the brake when the throttle is opened.

The accompanying drawings illustrate the invention. In such drawings.

Figure 1:
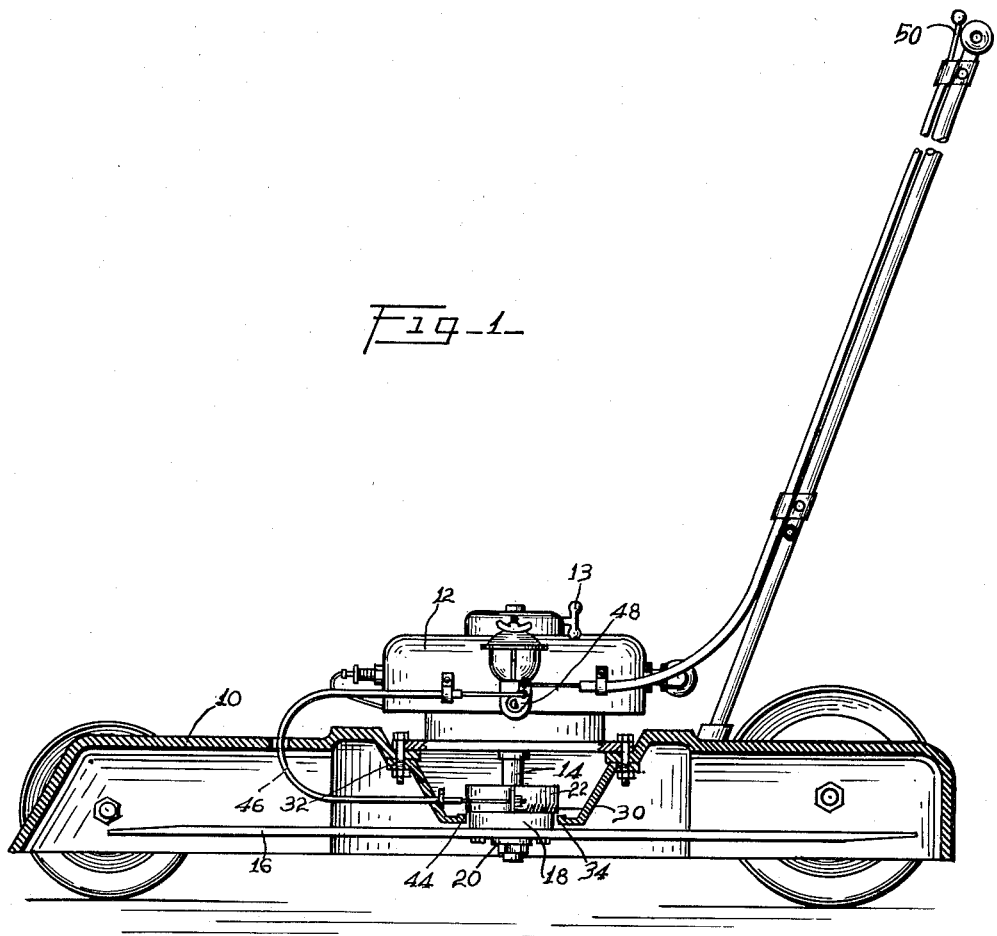
FIG. 1 is a vertical section of a rotary lawn mower embodying the invention.

The rotary mower shown in the drawings comprises a wheeled housing 10 in the shape of an inverted pan, which carries a vertical-shaft engine 12 bolted thereto by bolts 11 and having a shaft 14 carried by a bearing 15 and projecting downward centrally of the housing 10. The engine is desirably a conventional variable-speed internal combustion engine provided with a governor tending to maintain a selected speed, and having a manual control for varying the governed speed and adjustable to an idling position. In the preferred construction shown in the drawing, the depending engine shaft serves as the drive shaft to support and to drive the rotary motor blade 16. The blade 16 is replaceably mounted by bolts 17 on a hub 18 which is rotatably supported on a sleeve bearing 20 carried by the lower end of the shaft 14. The hub 18 carries a clutch drum 22 having an outer cylindrical wall 21 which stands upward from the upper face of the hub 18 and which forms the driven element of a centrifugal clutch for connecting the blade 16 to the shaft 14.

Figure 2:
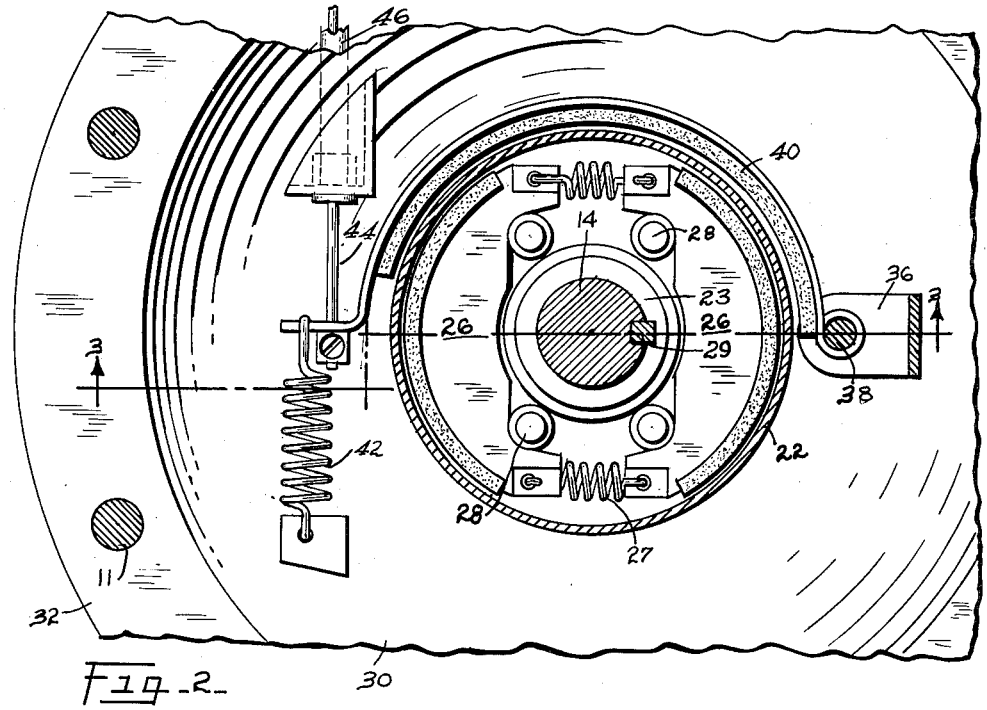
FIG. 2 is a horizontal section of the mower of FIG. 1, on an enlarged scale, taken on the line 2—2 of FIG. 3.
Figure 3:
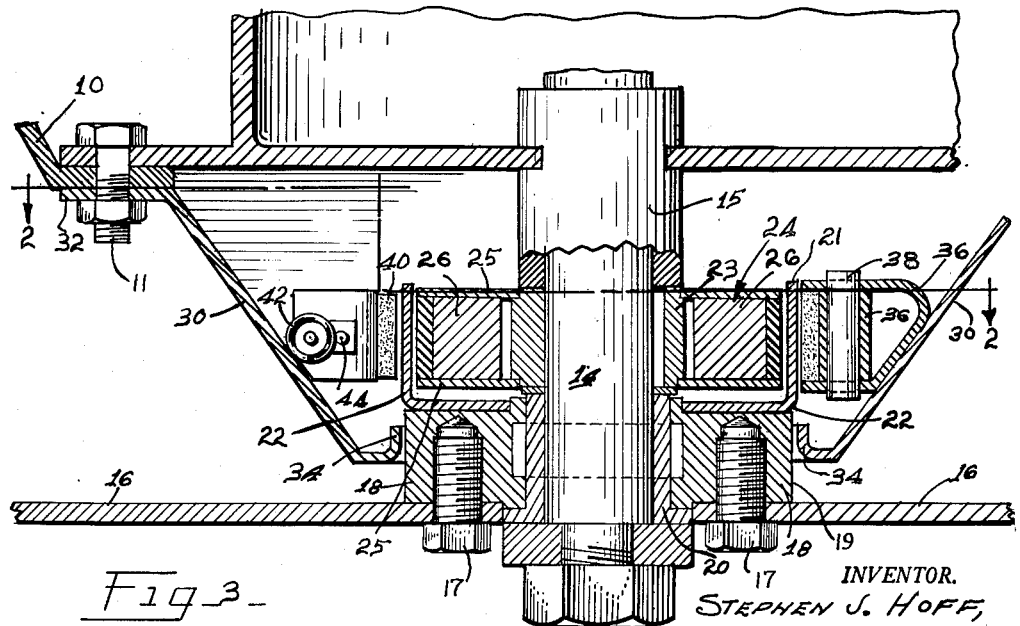
FIG. 3 is a vertical partial section taken on the line 3—3 of FIG. 2.

The driving element of the centrifugal clutch is an assembly 24 carried by and keyed by a key 29 to the shaft 14 within the clutch drum 22. This driving element assembly 24 has a central hub 23 and upper and lower side plates 25 rigidly secured to the hub and interconnected by four drive pins 28, as shown in FIG. 2. A pair of centrifugal shoes 26 are mounted between the side plates 25 and are spring pressed to retracted position, by springs 27. The shoes are supported in retracted position, and guided in their operative positions by underlying pairs of the pins 28 extending between and fixed to the side plates 25. At rest and at idling speeds the springs retain the shoes in retracted position, and the shoes positively engage at a predetermined higher speed and positively disengage at a predetermined reduced speed.

While the present invention in its broader aspects is not limited to the use of any particular clutch construction, I prefer to use the clutch construction shown. In that clutch construction, the shoes 26 are positively guided by the pins 28 and have a servo action which is controlled by the design of the pin-engaging surfaces of the shoes. In the present invention, the clutch is desirably one in which the action is characterized as a soft clutching action which gives positive drive under normal loads at operating speeds but which is capable—and desirably rather readily capable—of slipping in the event the blade rotation is obstructed. The clutch is thus one which does not lock up, and which, in the event the blade is slowed by a heavy load, will partially or wholly release to permit the engine to operate.

The centrifugal clutch and blade carrier is housed within a conical bowl 30 which is supported by a peripheral flange 32 bolted to the mower housing 10, conveniently by the same bolts 11 which mount the engine 12. The lower edge of such bowl 30 is turned inward and upward to form an anti-deflection barrier in the form of a ring 34 closely surrounding the cylindrical outer surface 19 of the hub 18, in running clearance relation therewith. The presence of such fixed ring 34 surrounding the hub 18 will prevent substantial lateral movement of the hub 18, and thus prevent deflection of the shaft 14 which would occur when the rapidly rotating blade 16 strikes a fixed or heavy obstruction.

The housing bowl 30 also serves as a support for a brake acting on the external surface of the clutch drum 22. To this end, the bowl 30 carries a bracket 36 which supports a pivot pin 38 to which is pivoted one end of a brake band 40. The opposite end of the brake band is engaged by a spring 42 which normally draws it into braking engagement with the external surface of the drum 22. It is retracted from such braking engagement by a Bowden wire 44 connected to a suitable manual control. As shown, the wire passes through a sleeve 46 fixed to the housing bowl 30 at its lower end and to a fixed part of the engine 12 at its upper end. The engine has a governor (not shown) controlled by a lever 48 which is manipulated by a control handle 50 mounted on the operating handle of the mower. The upper end of the brake control wire 44 is connected for common operation with the lever 48, as by being pivotally connected to that same lever 48.

The operation of the mower is as follows: When the engine 12 is at rest, the centrifugal clutch shoes 26 will be retracted by their springs 27 to disengaged position, and there will be no driving connection between the shaft 14 and the blade 16, and each can rotate independently of the other. With the lever 48 in idling position, the brake band 40 will lie in braking engagement with the clutch drum 22 carried with the blade 16, and the blade 16 will be braked against rotation. In these conditions, the engine 12 can be freely rotated by its starting mechanism, for example, by the rope starter 13, without driving the blade 16. The centrifugal clutch assembly 24 and the mass of its shoes 26 and the strength of its springs 27 will be selected so that such clutch will remain disengaged at idling speeds of the engine 12. As the throttle is opened by actuation of the governor lever 48, this will retract the brake control wire 44 and will release the brake 40 from braking engagement with the clutch drum 22, and the engine speed will increase. The engagement speed of the centrifugal clutch will then be reached, and the shoes 26 will be urged outward by centrifugal force into driving engagement with the clutch drum 22. The blade 16 will then be positively driven by the shaft 14.

In the operation of the mower, if the load gradually becomes excessive, the engine will be slowed, and the governor will open the throttle to overcome the reduction in speed, in accordance with known governor action. (Dyke's Automobile and Gasoline Engine Encyclopedia, 15th edition, 1930, page 946.) The reduced speed will tend to reduce the clutching action of the centrifugal clutch, and more or less slipping may occur depending on the conditions. If the load is not greatly excessive, the slipping will permit the engine to continue operating at a speed at which it develops substantial power, and the clutch delivers this power to the blade at a controlled rate. Such action is often sufficient to overcome the load. If the load increases, the clutch will further disengage, and allow the engine to continue to run without stalling. The operator can then manipulate the mower to relieve the load and normal operation will then resume.

In the event the blade 16 strikes a fixed object and its rotation is abruptly stopped, the clutch will act as a frictional connection to protect the engine from damage. But the momentum of the blade will tend to cause the blade and its mounting to pivot about the obstruction and thus tend to deflect the shaft 14 from its normal axis. Substantial deflection will be prevented, however, by the anti-deflection ring 34 which closely surrounds the hub 18, and the shaft will not be deformed. The clutch and anti-deflection ring thus cooperate to provide substantially full protection from damage in the event the blade strikes an obstruction.

The operator can stop the blade rotation at any time, without stopping the engine. To do so, he moves the manual control 50 to close the throttle of the engine 12, which releases the brake control wire 44 and allows the brake band 40 to move to engaged position under the influence of its spring 42. The engine 12 will slow down to idling speed and the centrifugal clutch 24 will fall below its engagement speed and will be disengaged. The engine 12 will then be released from the blade and can continue to operate at idling speed without driving the blade, and the blade will be stopped by the brake 40.

I claim as my invention:

1. In a rotary lawn mower having a mower housing including a generally horizontal top wall, the combination therewith of a drive shaft rotatably supported on said housing and extending in depending relation below said top wall, a blade carrier mounted on and wholly supported by the lower end of said shaft to support a blade for horizontal rotation in spaced relation below said wall, said mounting providing free non-driving rotation of said shaft relative to said blade carrier, a centrifugal clutch assembly between said shaft and blade carrier, said assembly comprising a clutch drum fixed on said carrier and rotatable therewith and forming the driven element of a centrifugal clutch, a centrifugal clutch driving element fixed on said shaft in clutching relation with said drum, said element being normally disengaged from said drum and having a friction clutching shoe engageable with said drum to frictionally clutch the driving element to the drum and blade carrier in response to rotation of said shaft at predetermined speeds higher than idling speed, whereby said shaft may be rotated at idling speeds without driving said blade carrier and will be frictionally clutched in driving relation with said blade carrie in response to centrifugal force at said higher speeds.

2. In a rotary lawn mower, the combination set forth in claim 1 in which said blade carrier comprises a hub portion having a circular periphery, with the addition of a clutch housing fixedly carried from said mower housing and enclosing said clutch assembly from exposure within the mower housing, said clutch housing including a fixed circular wall surrounding said circular periphery in running clearance relation therewith to provide an anti-deflection barrier for said blade-carrier and its supporting shaft.

3. In a rotary mower, the combination as defined in claim 1 with the addition of brake means between said blade carrier and a fixed element carried by said mower housing and normally operative to brake said blade carrier against rotation, and means to release said brake means when said shaft is rotated at clutch-engaging speed.

4. In a rotary lawn mower, the combination as defined in claim 3 in which said brake means comprises a brake shoe operative on the external surface of said clutch drum.

5. In a rotary mower, in combination, a mower housing having a generally horizontal top wall, a direct-drive internal combustion engine mounted on said wall and having a vertical drive shaft extending downward in depending unsupported relation through and below said top wall, a blade carrier mounted on and wholly supported by the lower end of said drive shaft in rotatable relation therewith, said engine drive shaft being rotatable at engine idling speeds without driving said blade carrier, a centrifugal clutch assembly between said drive shaft and blade carrier, said assembly comprising a clutch drum on said blade carrier and forming the driven element of a centrifugal clutch, and a centrifugal clutch driving element fixedly mounted on said shaft in clutching relation with said drum, said driving element being normally disengaged from said drum and having a normally retracted clutch shoe engageable with said drum to clutch the driving element to the drum and blade carrier in response to centrifugal force at predetermined drive shaft speeds above idling speed, whereby said engine may be cranked and operated at idling speeds without driving said blade carrier and will be clutched to and drive said drum and blade carrier at engine speeds higher than cranking and idling speeds.

References Cited in the file of this patent
UNITED STATES PATENTS

| | | |
|---|---|---|
| 2,477,442 | Cramer et al. | July 26, 1949 |
| 2,675,103 | Weber | Apr. 13, 1954 |
| 2,707,858 | Norton et al. | May 10, 1955 |
| 2,815,633 | Meyer | Dec. 10, 1957 |
| 2,854,865 | Rodgers | Oct. 7, 1958 |
| 2,868,343 | Sproul | Jan. 13, 1959 |
| 2,873,009 | Stelzer | Feb. 10, 1959 |